(12) United States Patent
Oxley

(10) Patent No.: US 6,330,783 B2
(45) Date of Patent: Dec. 18, 2001

(54) MOWER DECK

(75) Inventor: Lonnie Oxley, Versailles, KY (US)

(73) Assignee: The Lonmore Company, Means, KY (US)

( * ) Notice: Subject to any disclaimer, the term of this patent is extended or adjusted under 35 U.S.C. 154(b) by 0 days.

(21) Appl. No.: 09/745,964

(22) Filed: Dec. 23, 2000

Related U.S. Application Data

(62) Division of application No. 09/363,987, filed on Jul. 15, 1999, now Pat. No. 6,185,920.
(60) Provisional application No. 60/115,437, filed on Jan. 7, 1999.

(51) Int. Cl.[7] .................................................... A01B 34/12
(52) U.S. Cl. ............................................................ 56/320.2
(58) Field of Search .................................... 56/10.1, 11.6, 56/13.5, 13.6, 13.7, 16.9, 17.1, 17.5, 255, 295, 320.1, 320.2, DIG. 10–DIG. 17, DIG. 20, DIG. 22

(56) References Cited

U.S. PATENT DOCUMENTS

| 5,483,787 | | 1/1996 | Berrios . | |
|---|---|---|---|---|
| 5,970,693 | * | 10/1999 | Ciaglo | 56/12.7 |
| 6,038,840 | * | 3/2000 | Ishimori et al. | 56/13.3 |
| 6,148,595 | * | 11/2000 | Rabe et al. | 56/320.2 |

* cited by examiner

*Primary Examiner*—Robert E. Pezzuto
(74) *Attorney, Agent, or Firm*—Jack Toliver

(57) ABSTRACT

A combined discharge and grass collection mower deck (12) is adapted to have a baffle housing (20) attached at the deck's discharge opening that deflects grass clippings downwardly and outwardly into a diverging, narrow, fan-like pattern without wind rowing, or alternatively, the discharge opening may be closed by a plate (35), and a secondary opening (36) from the top of the deck is attach to a collection system.

4 Claims, 2 Drawing Sheets

MOWER DECK

PRIOR PATENT APPLICATIONS

This application and invention is a divisional of a U. S. patent application entitled Zero Radius Steering, Compact, Stand—On Mower and Utility Tractor, filed Jul. 15, 1999, serial No. 09/363,987, now U.S. Pat. No. 6,185,920 issued Feb. 13, 2001, which is based on a provisional application filed Jan. 7, 999, which is based on a provisional application filed Jan. 7, 1999, Ser. No. 60/115/437, which in turn is based on a provisional application filed Jul. 20, 1998, Ser. No. 07/093,420 and a non-copending non-provisional application filed Apr. 2, 1991, Ser. No. 07/679,567, subsequently abandoned. The present application was published Jun. 7,2001 US-2001-0002534-A1.

FIELD OF THE INVENTION

This invention pertains to rotary mowers, primarily riding mowers for grass cutting in lawn maintenance, and landscaping, where grass clippings are discharged behind the mower on to the ground as the mower travels or diverted from under the deck to a collector carried on the mower.

1. Background of the Invention

In rotary mowers, grass clippings tend to collect under the deck unless an efficient system is employed to discharge them. Typically, rear dispersal of clippings leaves windrows behind the mower which is objectionable in appearance and for grass horticultural and landscaping reasons.

2. Summary of the present Invention

This invention deals with a rear discharge mower deck where the grass clippings are either dispersed immediately behind the mower through a discharge opening, without windrowing, or alternatively, when the rear discharge opening is closed, conveying them to a bin to be bagged for later disposal.

In accordance with the invention, a mower deck is provided. At least one cutting blade rotates under the deck. It is driven by an engine shaft, or if a plurality of blades are employed, in a gang mower fashion, they are driven in a conventional manner, in a belt and pulley type of arrangement. Also, conventional means are provided for adjusting the height of the deck which floats above the ground for the proper height of cut relative to the ground.

A rear discharge opening from the deck exhausts the grass clippings into a baffle housing, which is aligned to the deck in a way to confine the clippings into a distribution pattern designed to spread the grass clippings uniformly to avoid the wind rowing problem of conventional rear discharge mowers.

Alternatively, when the deck is used with a collection system that exhausts the clippings from under the deck into a bag or bin, the rear discharge opening is closed off and secondary openings on top of the deck are opened to connect with the collection system carried on the mower.

A three blade, ganged mower deck is disclosed adapted to be underslung on the mower frame between the front and rear wheels, however, the principles that underlie the invention could be employed for a single blade mower, using side, front or rear mounted decks.

In the three blade, gang mower arrangement, one blade is rotated in a direction opposite to the other two blades. Blade chambers have curved baffles adjacent the rotating path of each blade discharging the clippings into the baffle housing for uniform dispersion of the grass clippings during rear discharge operations. There are three discharge paths defined by the baffles, a left path, a center path and a right path that converge toward the baffle housing. The latter has specifically designed baffles that diverge and deflect the clippings into a uniform discharge pattern.

Alternatively, the rear discharge opening of the deck is closed off and the secondary openings in the top of the deck are opened and connected to the collection system. Grass clippings are exhausted from under the deck into a bin carried on the mower for later bagging or disposal, rather than being distributed behind the mower.

An important object of this invention is to provide a mower deck capable of expelling grass clippings out the rear in a uniform pattern, without windrows.

Another object of the design is to provide a dual purpose mower deck that in one mode of operation expels clippings out the rear of the deck, and in another mode of operation, exhausts the clippings through openings in the top in conjunction with a conventional collection system.

Another object is to provide in conjunction with a rear discharge mower, a baffle housing aligned with the rear discharge opening of the deck containing baffles diverging outwardly to create a wide distribution path fanning out behind the mower to eliminate wind rowing.

Another object is to provide a mower deck in combination with a baffle housing aligned with the rear discharge opening of the deck that has a central baffle at the rear angled downwardly deflecting the grass clippings downwardly where the diverging baffles are the widest spread apart in defining a throat at the trailing end of the baffle housing.

Another object is to provide a deck in which the power of the rotating blades is more efficiently used in blade chambers having side walls, circumjacent the blades, creating turbulent air flow uniformly across the discharge opening directed rearwardly with a sufficient pressure head to expel the grass clippings through the baffle housing, that better forces the clippings out while keeping the underside of the deck clean.

Another object is to provide a deck that may be selectively used either in combination with a conventional collection system carried on the mower for accumulating the clippings in a bin on the mower, or to uniformly discharge the grass clippings rearwardly behind the mower when it is desirable to have the clippings spread immediately on the lawn, and in either mode, the deck is more efficient for expelling the grass due to the fan-like scroll shape of the blade chambers also consuming less power of the engine.

These and other objects of the invention will become more apparent by referring to the following detailed description of a preferred embodiment of the invention.

DETAILED DESCRIPTION OF THE INVENTION

Figure 1:
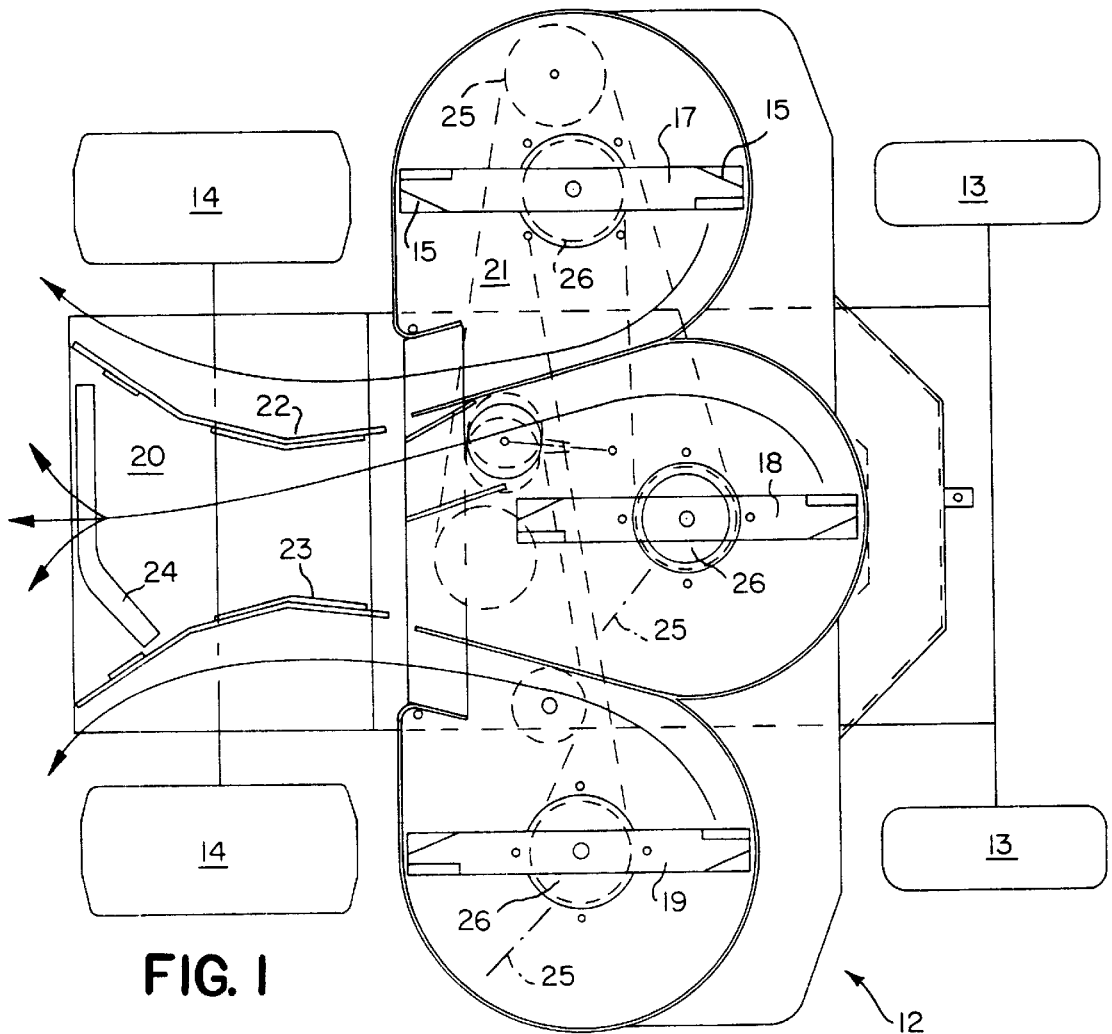
FIG. 1 is a bottom view of a mower deck employing the invention.

In FIG. 1, the invention will be described with respect to a gang mower deck (12) underslung between the front steerable wheels (13) and rear drive wheels (14) of a highly maneuverable, stand-on riding mower as disclosed in my co-pending application entitled "Zero Radius Steering, Compact Stand-on Mower and Utility Tractor" filed Jul. 15, 1999, serial No. 09/363,987, assigned to the assignee of the present invention. The invention will be described with reference to a rear discharge mower, however, it is applicable to a side discharge deck as disclosed in U.S. Pat. No. 5,483,787 entitled "Pivoting Auxiliary Blade Apparatus for Lawn Mower" filed Aug. 17, 1994 and issued Jan. 16, 1996. In FIG. 1, the underside of the mower deck 12 is shown floating under the chassis of the mower in a conventional manner. A control (not shown) can be used to adjust the grass cutting height of the deck. A triple blade, gang mower as depicted in FIGS. 1 and 2 which features three, side-by-side rotating mower blades (17, 18, 19) mounted on shafts which are driven by a belt and pulley arrangement, generally depicted by dashed lines, such that the blade (17) is driven in a clockwise manner in a circular blade chamber forming a scroll-like duct having an outer wall circumjacent the rotating arc of the blade tips discharging to the rear as depicted by the curved arrow, while the blades (18, 19) each rotate in a counter-clockwise manner and discharge to the rear from similar blade chambers, as depicted by the curving arrows, which represent the diverging air flow paths from the deck's discharge opening into a rear mounted baffle housing (20).

The baffle housing (20) is aligned with the rear discharge opening of the deck. The central blade (18) rotates in a counter-clockwise manner and discharges grass clippings through the center chamber of the housing (20), while the blade (19) also rotates in a counter-clockwise manner, and discharges into a right chamber of the baffle housing (20). Baffle plates (22, 23) curve left and right, respectively, and diverge from the center of the housing at angles to create multiple discharge paths for spreading the clippings widely behind the rear wheels (14). A central baffle (24) angles downwardly at the rear of the housing to deflect the central path discharge across the back center such that from three blade chambers, grass clippings are distributed uniformly across the rear and beyond the rear drive wheels of the mower. The blades each have wind tips (15) to create a partial pressure inside the deck and a violent circular flow of air. Linear string elements (25) may be mounted on hubs (26) close to the under surface of the deck for self-cleaning and secondary cutting of the grass cut by the blades. Such a self-cleaning arrangement is disclosed in my co-pending application, filed concurrently herewith (IP 102100) entitled "Self-Cleaning Mower" which is a continuation-in-part of my aforementioned application Ser. No. 09/363,987, filed Jul. 15, 1999, also assigned to the assignee of the present invention.

Figure 2:
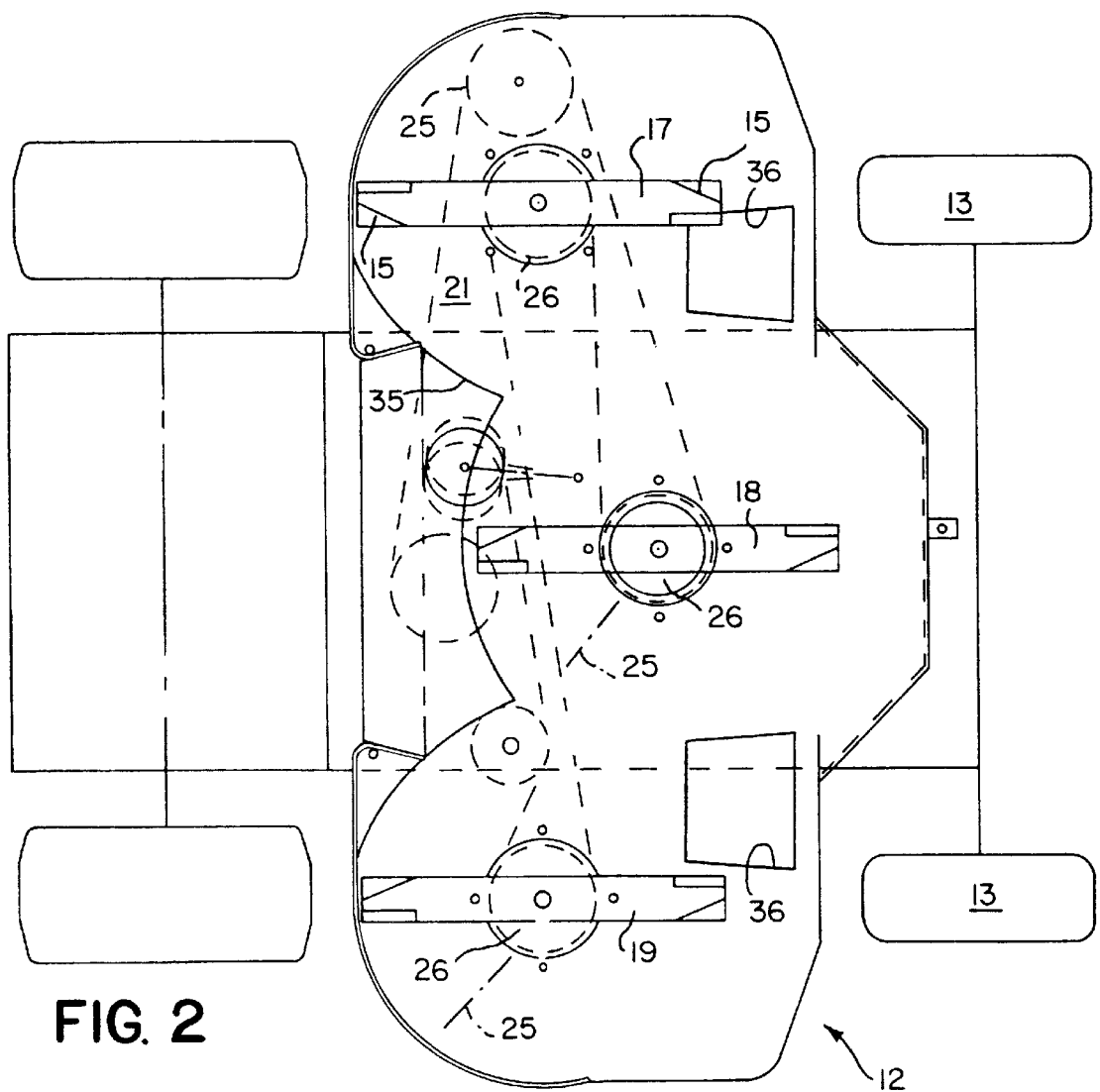
FIG. 2 a top view of the mower deck in FIG. 1.

In FIG. 2, a top view of the deck in FIG. 1, the deck is modified from a rear discharge mower deck to work with a collection system (not shown). The rear discharge opening is closed off by a plate (35) fastened in place confining the grass clippings within the blade chambers and out of the baffle housing (20). Instead, the clippings are caused to discharge through openings (36) which are otherwise closed during rear discharge. The openings (36) attach to ducts (not shown) exhausting clippings out through the top of the deck to a collection system including a bin carried on the mower when it is desirable to avoid distributing the clipping immediately on the ground.

In operation, there is a rear discharge pathway from each blade chamber, as depicted by the directional arrows, which converge toward front inlet openings of the baffle housing (20) adjacent the rear of the deck, and then the pathways diverge laterally from a center line of the baffle housing and deck, and run longitudinally toward rear outlet openings at the trailing end of the baffle housing (20). Cuttings are forced by the tip velocity of the blades into high pressure scroll-like pathways that increase the velocity of the air borne clippings due to a narrowing of the pathways at the inlet openings of the baffle housing, and then the clippings are slowed as they travel longitudinally toward the rear outlet openings of the baffle housing where the pathways diverge the widest, being there substantially wider than at the front inlet opening of the baffle housing. The horizontal central baffle (24) angles downwardly and rearwardly to deflect the slower moving clippings down into a common pathway merged behind the mower without leaving windrows.

The scroll-like walls circumjacent to the blades improve the circular air flow, enhancing the partial pressure differential under the deck so the clippings are exhausted more efficiently, either out the rear, or into the ducts of the collection system. In addition, the string elements (25) being located close to the underside of the deck, keep it relatively clean from wet grass clippings adhering to the deck. Also, the low inertia of the elements allows smaller braking forces to stop the blades as required by ANSI standards, and lower horsepower consumption in bringing the blades quicker up to mowing speed from a dead stop.

Accordingly, while the invention has been described in detail with respect to a dual purpose, rear discharge deck, it will be appreciated that the principles are not interdependent. One may be used without the other, but not both at the same time. Also, the deck may be used without the baffle housing, and the deck can discharge from the scroll-like blade chambers, closed off at the rear, while secondary openings in the top of the deck are connected to a collection system. Various components have been illustrated with respect to carrying out these functions, but it will be appreciated that other mechanical equivalents may be used without departing from the scope of the invention as set forth in the appended claims.

I claim:

1. A mower deck adapted to be mounted on a self-propelled tractor having front and rear ground engaging wheels, the tractor providing a source of power for the deck when the tractor is engaged for a mowing operation, the deck comprising a compartment defined by annular interior walls forming a blade chamber, a rotary shaft centrally located in the chamber for mounting a cutting blade thereon, drive means connectable to the shaft and engageable with the source of power of the tractor during a mowing operation for rotating the blade, and a rear discharge pathway having a front inlet and rear outlet opening for cuttings forced from the blade chamber by the rotation of the blade opening rearwardly into the front inlet from the blade chamber and diverging longitudinally near the outlet opening to a width substantially greater than the width of the inlet opening.

2. A mower deck as defined in claim 1 where the shaft has a plurality of low inertia filaments projecting radially near the underside of the, deck for self-cleaning.

3. A mower deck as set forth in claim 1 where the blade chamber has upper walls defining with said annular interior walls a scroll-like blade chamber and a secondary pathway is provided having an outlet opening in the upper walls of the deck, adapted to be closed when the rear discharge pathway is open, and open when the rear discharge pathway is closed, said latter condition enabling the secondary pathway for being attached to a collection system.

4. A mower deck for mounting on a self-propelled lawn tractor having annular interior walls defining a blade compartment, a shaft adapted to be driven by the tractor during a cutting operation extending centrally within said compartment, a blade mounted on the shaft for cutting grass and propelling the clippings around inside said annular interior walls toward a discharge opening at the rear, the improvement comprising:

a baffle housing adapted to be mounted to the rear of the mower deck having an inlet and outlet opening in alignment with said discharge opening from the deck comprising vertical side baffles diverging outwardly from a centerline defining a horizontal fan-like pattern, and a horizontal center baffle across the widest part of the fan—like patter angled downwardly for deflecting the grass cuttings in a path substantially wider than the width of said discharge opening.

* * * * *